United States Patent
Gazzaley

(10) Patent No.: US 12,465,275 B2
(45) Date of Patent: Nov. 11, 2025

(54) MOLECULARLY-INITIATED, EXPERIENTIALLY-DELIVERED TREATMENTS AND SYSTEMS FOR PRACTICING SAME

(71) Applicant: The Regents of the University of California, Oakland, CA (US)

(72) Inventor: Adam Gazzaley, San Francisco, CA (US)

(73) Assignee: The Regents of the University of California, Oakland, CA (US)

( * ) Notice: Subject to any disclaimer, the term of this patent is extended or adjusted under 35 U.S.C. 154(b) by 414 days.

(21) Appl. No.: 17/915,884

(22) PCT Filed: Mar. 31, 2021

(86) PCT No.: PCT/US2021/025170
§ 371 (c)(1),
(2) Date: Sep. 29, 2022

(87) PCT Pub. No.: WO2021/202730
PCT Pub. Date: Oct. 7, 2021

(65) Prior Publication Data
US 2023/0126036 A1    Apr. 27, 2023

Related U.S. Application Data

(60) Provisional application No. 63/003,734, filed on Apr. 1, 2020.

(51) Int. Cl.
*G16H 50/20*    (2018.01)
*A61B 5/00*    (2006.01)
(Continued)

(52) U.S. Cl.
CPC ............ *A61B 5/4005* (2013.01); *A61B 5/165* (2013.01); *A61B 5/378* (2021.01); *A61K 31/675* (2013.01);
(Continued)

(58) Field of Classification Search
CPC .............................. A61B 5/4005; G16H 50/20
(Continued)

(56) References Cited

U.S. PATENT DOCUMENTS 8,113,991 B2    2/2012 Kutliroff
2010/0199228 A1    8/2010 Latta et al.
(Continued)

FOREIGN PATENT DOCUMENTS

WO    WO/2015/026988 A1 †    6/2015
WO    2019079742 A1    4/2019
(Continued)

*Primary Examiner* — Nadia A Mahmood
(74) *Attorney, Agent, or Firm* — Brian E. Davy; Bozicevic, Field & Francis LLP

(57) ABSTRACT

Provided are methods comprising presenting a sensory environment to an individual experiencing the effects of a psychoactive agent, monitoring the neural status, the physiological status, or both, of the individual, and presenting a modified sensory environment to the individual based on the monitoring. In certain embodiments, the agent is a psychedelic agent. According to some embodiments, presenting a sensory environment to the individual comprises presenting to the individual a visual stimulus, an auditory stimulus, a tactile stimulus, an olfactory stimulus, or any combination thereof. In certain embodiments, presenting a modified sensory environment to the individual comprises presenting a customized sensory environment to the individual in real-time based on the monitoring. In some embodiments, the individual is suffering from a mental health condition selected from depression, anxiety, post-traumatic stress disorder (PTSD), addiction, and any combination thereof.

(Continued)

Systems that find use in practicing the methods of the present disclosure are also provided.

20 Claims, 2 Drawing Sheets

(51) Int. Cl.
*A61B 5/16* (2006.01)
*A61B 5/378* (2021.01)
*A61K 31/675* (2006.01)
*A61M 21/02* (2006.01)
*G16H 20/10* (2018.01)
*G16H 20/70* (2018.01)
*A61B 5/0205* (2006.01)
*A61B 5/37* (2021.01)
*A61B 5/38* (2021.01)
*A61M 21/00* (2006.01)

(52) U.S. Cl.
CPC ............ *A61M 21/02* (2013.01); *G16H 20/10* (2018.01); *G16H 20/70* (2018.01); *G16H 50/20* (2018.01); *A61B 5/0075* (2013.01); *A61B 5/0205* (2013.01); *A61B 5/163* (2017.08); *A61B 5/37* (2021.01); *A61B 5/38* (2021.01); *A61M 2021/0022* (2013.01); *A61M 2021/0027* (2013.01); *A61M 2021/0044* (2013.01)

(58) Field of Classification Search
USPC .......................................................... 607/45
See application file for complete search history.

(56) References Cited

U.S. PATENT DOCUMENTS

| | | |
|---|---|---|
| 2013/0342527 A1 | 12/2013 | Molyneaux et al. |
| 2014/0057232 A1 | 2/2014 | Wetmore et al. |
| 2014/0244008 A1 | 8/2014 | Kennett et al. |
| 2016/0074583 A1* | 3/2016 | Hyde ................... A61M 21/02 600/27 |
| 2018/0133504 A1 | 5/2018 | Malchano et al. |
| 2019/0132948 A1 | 5/2019 | Longinotti-Buitoni et al. |
| 2019/0201691 A1 | 7/2019 | Poltorak |
| 2020/0086078 A1† | 3/2020 | Poltorak |

FOREIGN PATENT DOCUMENTS

| | | |
|---|---|---|
| WO | WO/2019/161050 A1 † | 8/2019 |
| WO | 2019212901 | 11/2019 |
| WO | WO2020142259 A1 | 7/2020 |
| WO | WO2021026400 A1 | 2/2021 |

\* cited by examiner
† cited by third party

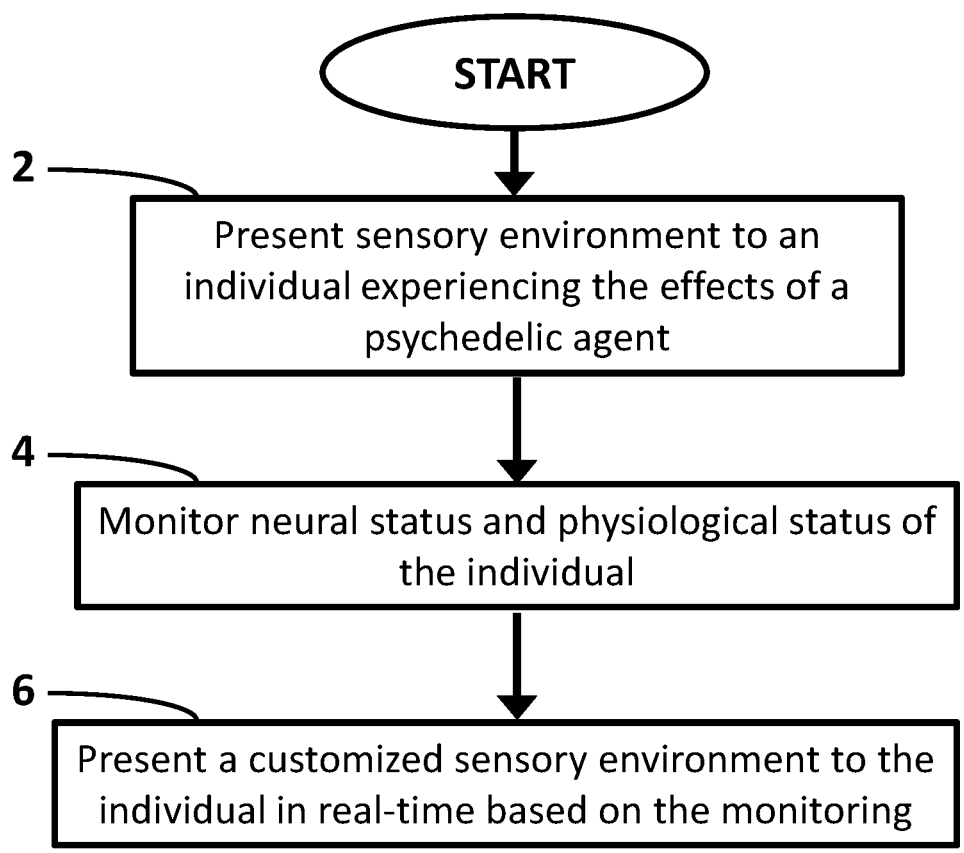

MOLECULARLY-INITIATED, EXPERIENTIALLY-DELIVERED TREATMENTS AND SYSTEMS FOR PRACTICING SAME

CROSS-REFERENCE TO RELATED APPLICATIONS

This application claims the benefit of U.S. Provisional Patent Application No. 63/003,734, filed Apr. 1, 2020, which application is incorporated herein by reference in its entirety.

INTRODUCTION

After decades of suppression of scientific inquiry into the therapeutic effects of psychedelics, a handful of intrepid researchers have pushed through the barriers to once again show the world the power of these transformative agents for the ailing human mind. They have relaunched us on a path towards generating convincing evidence of clinical efficacy and safety for individuals with a broad range of mental health conditions—such as depression, anxiety, post-traumatic stress disorder (PTSD), and addiction—as well as a deeper understanding of their neural mechanisms of action.

The timeliness of these advances cannot be overstated. Over half a billion people worldwide are suffering from the debilitating effects of mental health conditions, and the numbers are increasing. Meanwhile, the pharmaceutical industry continues to recycle the same short list of drugs, which leave many patients without effective treatments and the remainder with significant side effects. Fortunately, there is momentum for change as evidenced by recent FDA breakthrough therapy designation for MDMA and psilocybin as PTSD and depression treatments, and $17M and $3.8M donations to Johns Hopkins and Imperial College to establish Psychedelic Research Centers.

Despite important scientific breakthroughs in both clinical validation and mechanisms of action of psychedelics, there is a current lack of approaches aimed at optimizing the treatments themselves in order to engender more positive outcomes.

SUMMARY

Provided are methods comprising presenting a sensory environment to an individual experiencing the effects of a psychoactive agent, monitoring the neural status, the physiological status, or both, of the individual, and presenting a modified sensory environment to the individual based on the monitoring. In certain embodiments, the agent is a psychedelic agent. According to some embodiments, presenting a sensory environment to the individual comprises presenting to the individual a visual stimulus, an auditory stimulus, a tactile stimulus, an olfactory stimulus, or any combination thereof. In certain embodiments, presenting a modified sensory environment to the individual comprises presenting a customized sensory environment to the individual in real-time based on the monitoring. According to some embodiments, the individual is suffering from a mental health condition selected from depression, anxiety, post-traumatic stress disorder (PTSD), addiction, pain, and any combination thereof. Systems that find use in practicing the methods of the present disclosure are also provided.

BRIEF DESCRIPTION OF THE FIGURES

FIG. 2 is a flow diagram illustrating steps of a method according to one embodiment of the present disclosure.

DETAILED DESCRIPTION

Figure 1:
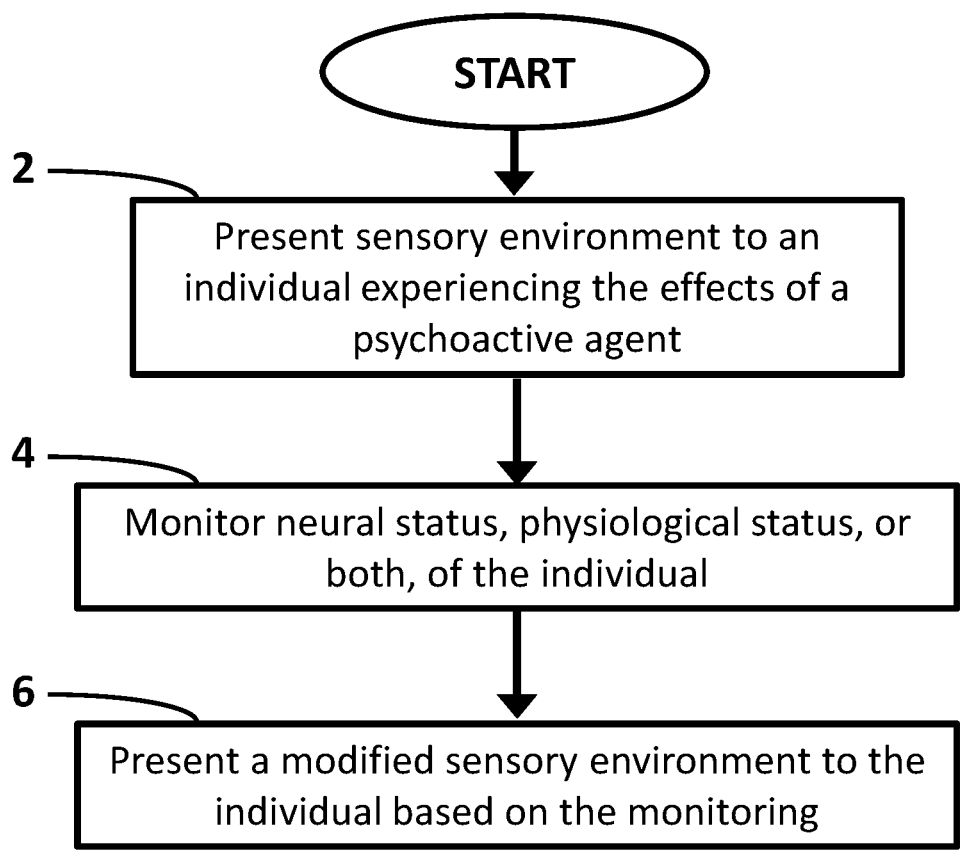
FIG. 1 is a flow diagram illustrating steps of a method according to one embodiment of the present disclosure.

Before the methods and systems of the present disclosure are described in greater detail, it is to be understood that the methods and systems are not limited to particular embodiments described, as such may, of course, vary. It is also to be understood that the terminology used herein is for the purpose of describing particular embodiments only, and is not intended to be limiting, since the scope of the methods and systems will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the methods and systems. The upper and lower limits of these smaller ranges may independently be included in the smaller ranges and are also encompassed within the methods and systems, subject to any specifically excluded limit in the stated range. Where the stated range includes one or both of the limits, ranges excluding either or both of those included limits are also included in the methods and systems.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which the methods and systems belong. Although any methods and systems similar or equivalent to those described herein can also be used in the practice or testing of the methods and systems, representative illustrative methods and systems are now described.

All publications and patents cited in this specification are herein incorporated by reference as if each individual publication or patent were specifically and individually indicated to be incorporated by reference and are incorporated herein by reference to disclose and describe the materials and/or methods in connection with which the publications are cited. The citation of any publication is for its disclosure prior to the filing date and should not be construed as an admission that the present methods and systems are not entitled to antedate such publication, as the date of publication provided may be different from the actual publication date which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It is appreciated that certain features of the methods and systems, which are, for clarity, described in the context of separate embodiments, may also be provided in combination in a single embodiment. Conversely, various features of the methods and systems, which are, for brevity, described in the context of a single embodiment, may also be provided separately or in any suitable sub-combination. All combinations of the embodiments are specifically embraced by the present disclosure and are disclosed herein just as if each and every combination was individually and explicitly disclosed, to the extent that such combinations embrace operable processes and/or compositions. In addition, all sub-combinations listed in the embodiments describing such variables are also specifically embraced by the present methods and systems and are disclosed herein just as if each and every such sub-combination was individually and explicitly disclosed herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present methods. Any recited method can be carried out in the order of events recited or in any other order that is logically possible.

Methods

The present disclosure provides methods comprising presenting a sensory environment to an individual experiencing the effects of a psychoactive agent, monitoring the neural status, the physiological status, or both, of the individual, and presenting a modified sensory environment to the individual based on the monitoring. The methods of the present disclosure (as well as the related systems and computer-readable media) constitute an advancement in psychoactive (e.g., psychedelic) agents as, e.g., precision clinical tools. In certain embodiments, neural and physiological data are monitored and then the sensory environment (or "context") of the individual is manipulated (e.g., via changing sensory stimulation) to optimize treatment effects. This advance is fundamental to advancing a new generation of highly effective, accessible, and personalized medicines.

There is a current lack of approaches aimed at optimizing psychedelic treatments in order to engender more positive outcomes. According to some embodiments, the present disclosure provides approaches that record neural and/or physiological data and then manipulate the context (e.g., sensory stimulation) to optimize treatment effects. This advance is fundamental to advancing a new generation of highly effective, accessible, and personalized medicines.

With respect to recording, as is true for all molecular interventions, there is great variability in the response of any given patient to a treatment. Understanding and leveraging these individual differences enables a personalized medicine approach to psychedelic treatments. And so, the methods of the present disclosure comprise monitoring (or "evaluating" or "assessing") each patient's neural and/or physiological status during a treatment. This provides an understanding, e.g., in real-time, how their psychedelic experience was unfolding so as to dynamically personalize the ongoing contextual factors, thus maximizing long-term, sustainable positive benefits.

With respect to context, psychedelics are unique amongst pharmaceuticals in that the major influence on clinical outcome, even whether positive or negative, are the contextual elements that define the patient's experience. It has been documented that under appropriate context negative side-effects are extremely rare, and that there is a positive correlation between contextual factors and subsequent beneficial effects (e.g., the nature of a music experience during treatment is predictive of reductions in depression). Based upon this understanding, psychedelics can reasonably be viewed as molecularly-initiated, experiential medicine.

In certain embodiments, a closed-loop experience is provided in which the sensory environment presented to the individual (context) is customized in real time based upon her/his own cognitive and emotional state measured in the moment (recording). This approach allows for personalized and precisely-targeted experiences that are adaptively adjusted to create the ideal content, challenges, and rewards to harness each brain's inherent plasticity to optimize function. Recent advances in digital technologies (sensory presentation devices, physiological recording sensors, and machine learning algorithms) now offer the ability to generate powerful, closed-loop experiences, unlocking entirely new treatment approaches.

According to some embodiments, the methods of the present disclosure constitute an integration of psychedelics and technology, essentially uniting molecularly-initiated and digitally-delivered approaches to launch a new era of experiential medicine. Understanding the role of context in creating the ideal treatment experience for each patient, as informed by real-time recordings of neural and/or physiological data, enables the first ever closed-loop, psychedelic treatments.

An instantiation of the methods of the present disclosure is to systematically manipulate context via the presentation of different sensory environments during psychedelic treatments (visual, auditory, tactile, olfactory, and/or the like), as based upon data from the participant achieved with simultaneous recordings of state-dependent physiology. This constitutes a closed-loop treatment that personalizes context during treatments based on a participant's real-time data. Such treatments will be more accessible, reproducible and personalizable than existing psychedelic treatments for mental health conditions.

According to some embodiments, the methods of the present disclosure are computer-implemented. By "computer-implemented" is meant at least one step of the method is implemented using one or more processors and one or more non-transitory computer-readable media. The computer-implemented methods of the present disclosure may further comprise one or more steps that are not computer-implemented.

According to the methods of the present disclosure, the individual is experiencing the effects of a psychoactive agent. As used herein, a "psychoactive agent" is a chemical substance that changes brain function and results in alterations in perception, mood, consciousness, cognition, or behavior. Non-limiting examples of psychoactive agents of which the individual may be experiencing the effects include anesthetics, opioid receptor agonists (e.g., fentanyl), antidepressants (e.g., selective serotonin reuptake inhibitors (SSRIs)), stimulants, antipsychotics, mood stabilizers, anxiolytics, hypnotics, acetylcholinesterase inhibitors (e.g., donepezil), an attention-deficit hyperactivity disorder (ADHD) drug (e.g., an amphetamine, such as but not limited to dextroamphetamine and amphetamine (Adderall)), inhalants, and the like. According to some embodiments, the psychoactive agent is a psychedelic agent. As used herein, a "psychedelic agent" is a chemical substance that triggers a psychedelic experience (e.g., via serotonin receptor agonism), causing thought, visual and auditory changes, and an altered state of consciousness. In some embodiments, the individual is experiencing the effects of a psychedelic agent selected from psilocybin, 3,4-Methylenedioxymethamphetamine (MDMA), lysergic acid diethylamide (LSD), N,N-

Dimethyltryptamine (DMT), mescaline, peyote, 2,5-dimethoxy-4-bromophenethylamine (2C—B), 2,5-Dimethoxy-4-methylamphetamine (DOM), NBOMes (N-methoxybenzyl), and any combination thereof.

The methods of the present disclosure comprise presenting a sensory environment to the individual experiencing the effects of the psychoactive agent. Presenting a sensory environment to the individual comprises presenting one or more sensory stimuli to the individual. In certain embodiments, presenting a sensory environment to the individual comprises presenting to the individual one or more visual stimuli, one or more auditory stimuli, one or more tactile stimuli, one or more olfactory stimuli, or any combination thereof.

Examples of visual stimuli include, but are not limited to, presenting to the individual one or more flashes of light, one or more shapes (e.g., colored or non-colored shapes), one or more colors, one or more scenes (e.g., a nature scene, a city scene, a live music scene, a scene from outer space, a scene that includes elements from the individual's past and/or present living environment), one or more digital photos (e.g., one or more digital images from the individual's past (e.g., the individual's childhood), the individual's family and/or friends, etc.), and/or the like.

When presenting a sensory environment to the individual comprises presenting to the individual one or more visual stimuli, in certain embodiments, the one or more visual stimuli are presented to the individual via one or more displays. Non-limiting examples of displays that may be employed include a television (e.g., a high-definition television (HDTV)), a monitor, a projection screen, the display of a mobile device (e.g., tablet computer or smartphone), a head-mounted display, or any other suitable display for presentation of visual stimuli to the individual. According to some embodiments, one or more visual stimuli are presented to the individual via a head-mounted display. Non-limiting examples of head-mounted displays include headsets or glasses, for example, virtual/augmented reality headsets or virtual/augmented reality glasses. A head-mounted display that finds use in the methods and systems of the present disclosure include Microsoft's HoloLens® 2 head-mounted display, or equivalent. In certain embodiments, when a head-mounted display is employed, the sensory environment presented to the individual comprises a virtual reality environment or augmented reality environment.

An "auditory stimulus" refers to a sound and may be characterized by, for example, frequency, loudness (i.e., intensity), timbre, or any parametric combination of these or any other sound features. Examples of auditory stimuli include, but are not limited to, presenting to the individual one or more tones, a rhythm, a beat, music (vocal, instrumental, or combinations thereof), nature sounds, one or more voices, and/or the like. When presenting a sensory environment to the individual comprises presenting to the individual one or more auditory stimuli, in certain embodiments, the one or more auditory stimuli are presented to the individual via one or more speakers, headphones (including wired or wireless headphones), and/or the like.

Tactile stimuli are those related to the sense of touch and include, but are not limited to, objects that the individual touches with her/his hand(s), foot/feet, or other body part. Tactile stimuli also include stimuli that vibrate the individual or a portion thereof, including but not limited to, vibrations emitted from a chair, sofa, bed, and/or the like.

Olfactory stimuli are those relating to the sense of smell. When presenting a sensory environment to the individual comprises presenting to the individual one or more olfactory stimuli, in certain embodiments, the one or more olfactory stimuli comprise the smell of a plant (e.g., a tree, flower, fruit, and/or the like), aromatic essential oils, a food, and/or the like.

The methods of the present disclosure comprise, during the presenting of the sensory environment to an individual experiencing the effects of a psychoactive agent, monitoring the neural status, the physiological status, or both, of the individual. Accordingly, in certain embodiments, the neural status of the individual is monitored. The neural status of the individual may be indicative of the stress, mood, attention, arousal, and/or the like experienced by the individual during the presentation of the sensory environment. In certain embodiments, the neural status of the individual is monitored by electroencephalography (EEG), functional magnetic resonance imaging (fMRI), near-infrared spectroscopy (NIRS), electrocortocography (ECoG), or any combination thereof.

In certain embodiments, the method employed for monitoring neural status may be a noninvasive method, i.e., where no device or portion thereof is implanted into the individual or under the skin of the individual. For example, in some instances, neural activity may be monitored using a EEG device that contacts, but does not penetrate, the scalp of the individual, or a noninvasive imaging device such as, e.g., a fMRI device. In certain embodiments, the neural status of the individual is monitored by EEG using an EEG device (e.g., an EEG cap, such as a 64-channel EEG cap (or "headset")) worn by the individual to enable recording of voltage fluctuations resulting from ionic current flows within the neurons of the brain at desired intervals, including in real-time, during presentation of the sensory environments.

According to some embodiments, the method employed for monitoring neural status may be an invasive or minimally invasive method where a neural activity detection device, or a portion thereof, is implanted into the subject, including e.g., into the brain of the subject, onto the surface of the brain of the subject, under the skin of the scalp of the subject, etc. For example, in some instances, the electrodes of an ECoG device may be place or implanted onto the surface of the brain of the individual.

In certain embodiments, detected neural activity may be "co-registered" (i.e., "mapped") onto a reference map or model of a brain. The reference map of the brain may be a general reference map or an individual-specific reference map. For example, in instances where an individual-specific reference map is used, the method may include mapping the individual's brain with one or more brain imaging techniques and overlaying the detected neural activity onto the individual-specific map. A reference brain map of an individual may be obtained prior to monitoring neural status during presentation of the sensory environments. Alternatively, a reference brain map may be obtained during the monitoring of the herein described methods, including, e.g., where the method of monitoring neural status simultaneously produces a subject-specific brain map (e.g., as in fMRI) or where a neural activity monitoring technique is combined with a second technique for brain imaging (e.g., combined MRI and EEG recording).

According to some embodiments, neural status monitored using high-density EEG is mapped in real-time or near real-time (e.g., computational lag of less than 1 second, including but not limited to e.g., less than 500 milliseconds, less than 400 milliseconds, less than 300 milliseconds, less than 200 milliseconds, between 200 to 100 milliseconds, etc.) onto a previously acquired Diffusion Tensor Imaging (DTI) 3D reconstruction of the individual's brain. By "high-density EEG" is meant at least 64-channel EEG, however, EEG sensor density may vary and may include, in some instances, greater than 64-channel EEG (e.g., 128-channel EEG), less than 64-channel EEG (e.g., 32-channel EEG, 24-channel EEG, etc.). In some instances, different physiologically relevant frequency bands may be differentiated including e.g., where only certain bands are displayed, where different bands are displayed at different intensities (including absolute intensities, relative intensities, threshold intensities, etc.), where different bands are displayed in different colors. Different physiologically relevant frequency bands include physiologically relevant alpha frequency bands (e.g., 8-12 Hz), physiologically relevant beta frequency bands (e.g., 12-20 Hz) and physiologically relevant theta frequency bands (e.g., 4-8 Hz). In some instances, before display, neural activity may be corrected for irrelevant interference including but not limited to e.g., ocular artifacts, muscular artifacts, etc. In some instances, effective connectivity may be and mapped and/or visualized calculated in real-time or near real-time onto a previously acquired reference brain model, including e.g., a DTI 3D reconstruction.

In certain embodiments, the methods of the present disclosure comprise, during the presenting of the sensory environment to an individual experiencing the effects of a psychoactive agent, monitoring the physiological status of the individual. The physiological status of the individual may be indicative of the stress, mood, attention, arousal, and/or the like experienced by the individual during the presentation of the sensory environment. According to some embodiments, monitoring the physiological status of the individual comprises monitoring one or more of the individual's heart rate, heart rate variability, blood pressure, respiration, electrodermal activity (e.g. galvanic skin response (GSR)), movement, eye movement, pupillary response, facial expression, and any combination thereof.

In certain embodiments, heart rate and/or heart rate variability are monitored using a mobile heart rate detection device, such as a device worn by the individual during presentation of the sensory environment. According to some embodiments, the device is worn on the individual's wrist, an example of which includes the Peak fitness tracker by Basis, Inc. and the V800 sports watch by Polar Electro, Inc.

According to some embodiments, monitoring the physiological status of the individual comprises monitoring movement of the individual. Any convenient sensors or devices may be employed to detect the individual's body movement, including wired or wireless motion sensors worn by the individual, a motion/position capture device, e.g., a motion/position capture device that includes a depth camera to capture depth images of feature points of interest on the individual's body, and the like.

In certain embodiments, the individual's movement is monitored using sensors (e.g., wired or wireless sensors) worn on the body of the individual. Such sensors may be worn on one or both of the individual's arms, one or both of the individual's legs, and/or any other useful location on the individual's body for monitoring the individual's movement and/or position during the presentation of the sensory environment. In certain embodiments, the sensors are "wireless" sensors that communicate wirelessly with the system being implemented to the carry out the method. Such wireless sensors are known and include the PrioVR motion-tracking body suits available from YEI Corporation (Portsmouth, Ohio).

According to some embodiments, the individual's movement is monitored using a motion/position capture device during the presentation of the sensory environment. A non-limiting example of a motion capture device includes a video camera, such as an RGB video camera and/or a depth camera. Movements made by the individual are captured in a sequence of images and then processed. The motion capture device, alone or in conjunction with a second component (e.g., a video game console) may perform functions including, but not limited to, detecting and performing gesture recognition on the individual's movements and monitoring direction and relative distance moved by the individual. Images of the individual's movements may be stored for analysis.

Further details regarding motion capture devices for detecting movement are found, e.g., in U.S. Pat. No. 8,113, 991, U.S. Patent Application Publication No. US 2010/ 0199228, U.S. Patent Application Publication No. US 2013/ 0342527, and U.S. Patent Application Publication No. US 2014/0244008, the disclosures of which are incorporated herein in their entireties for all purposes.

Motion/position capture devices that find use in monitoring movement are available and include Microsoft's Kinect motion capture device (e.g., the Microsoft Kinect for Windows v2), Sony's EyeToy® motion capture device, and the like.

Electrodermal activity (e.g., electrodermal responses) of interest include, but are not limited to, the galvanic skin response (GSR). In certain embodiments, GSR is detected using a mobile GSR detection device, such as a device worn by the individual during presentation of the sensory environment. According to certain embodiments, the device is worn on the individual's wrist, an example of which includes the Peak fitness tracker by Basis, Inc.

Suitable approaches for detecting the individual's pupillary response include capturing images of one or both of the individual's pupils during presentation of the sensory environment. In certain embodiments, a motion capture device employed to detect the subject's body movement is also used to detect the individual's pupillary response during presentation of the sensory environment. Pupillary responses of interest include constriction (miosis) and/or dilation (mydriasis).

Accordingly, one or more physiological parameters of the individual may be monitored using a wearable device, one or more cameras, and/or the like.

According to some embodiments, monitoring the neural status, the physiological status, or both, of the individual is performed continuously for a period of time and is used to monitor the state of the individual in real-time, where the state of the individual comprises one or more of stress, mood, attention, arousal, and any combination thereof.

As summarized above, the methods include presenting a modified sensory environment to the individual based on the monitoring. The sensory environment is modified to manipulate the context in which the individual is experiencing the effects of the psychoactive (e.g., psychedelic) agent in order to optimize treatment effects. By way of example, when the sensory environment comprises music and the monitoring determines that the individual is experiencing an undesirably high stress level (e.g., has reached a threshold stress level as determined by one or more neural and/or physiological parameters), the methods may include modifying the sensory environment by reducing the volume of the music, ceasing the music in favor of silence, presenting a different (e.g., more "soothing") form of music, nature sounds, a soothing voice, and/or the like.

In certain embodiments, presenting a modified sensory environment to the individual comprises presenting a customized sensory environment to the individual in real-time based on the monitoring. For example, modified sensory environments may be presented to the individual in an iterative manner based on the individual's "state" (which may comprise one or more of stress, mood, attention, and/or arousal) of the individual as determined based on the individual's neural status and/or the physiological status.

According to some embodiments, the methods of the present disclosure further comprise administering the psychoactive (e.g., psychedelic) agent to the individual in an amount effective for the individual to experience the effects of the agent. The psychoactive agent may be administered via a route of administration appropriate for the particular agent employed, e.g., by oral, parenteral, transdermal, transmucosal, intranasal, or other suitable route of administration.

In certain embodiments, the individual is suffering from a mental health condition selected from the group consisting of: depression, anxiety, post-traumatic stress disorder (PTSD), addiction, pain, and any combination thereof. When the individual is suffering from a mental health condition, according to some embodiments, the method is effective in treating the mental health condition. By "treat" or "treatment" is meant at least an amelioration of one or more symptoms associated with the mental health condition of the individual, where amelioration is used in a broad sense to refer to at least a reduction in the magnitude of a parameter, e.g., symptom, associated with the mental health condition being treated. As such, treatment also includes situations where the mental health condition, or at least one or more symptoms associated therewith, are completely inhibited, e.g., prevented from happening, or stopped, e.g., terminated, such that the individual no longer suffers from the mental health condition, or at least the symptoms that characterize the mental health condition.

According to any embodiments of the present disclosure, one or more steps may be computer-implemented. In certain embodiments, a computer system may perform the monitoring and present monitoring data to a therapist, where the therapist visualizes the monitoring data (e.g., on a display) and presents one or more modified sensory environments to the individual based on the monitoring data. The therapist may present the one or more modified sensory environments solely based on her/his judgment based on the monitoring data. Alternatively, or additionally, in certain embodiments, a computer system implementing one or more steps of the method may suggest one or more modifications to the sensory environment based on the monitoring data, where the therapist presents a modified sensory environment to the individual based on one or more of the modifications suggested by the computer system.

In certain embodiments, each step of any of the methods of the present disclosure may be computer-implemented. That is, each step may be performed automatically by a computer system. For example, a computer system may automatically present a first sensory environment to the individual experiencing the effects of a psychoactive agent, monitor the neural status, the physiological status, or both, of the individual, and present a modified sensory environment to the individual based on the monitoring data, e.g., in an artificial intelligence (AD-driven closed loop.

Non-limiting examples of computer-readable media and systems that find use in computer-implementation of the methods of the present disclosure are described hereinbelow.

According to some embodiments, prior to the method being performed on an individual experiencing the effects of a psychoactive agent, diagnostic and/or baseline information may be obtained from the individual when the individual is not under the influence of the psychoactive (e.g., psychedelic) agent. In certain embodiments, the individual not under the influence of the psychoactive agent may be placed under conditions similar or the same as those described above, e.g., presented with a sensory environment, monitored for neural and/or physiological status, and presented with one or more modified sensory environments based on the monitoring. Such diagnostic and/or baseline information (which may be coupled with other tests, e.g., MRI, genetics, interview, stress testing, blood work) yields predictive data that may be used to inform the starting parameters of the method (e.g., treatment) when the subject is under the influence of the psychoactive agent. Such starting parameters may include the initial sensory environment presented to the individual when the individual is experiencing the effects of the psychoactive agent (e.g., psychedelic agent), the types of appropriate initial modifications to the initial sensory environment, the particular psychoactive agent employed, the dosage of the psychoactive agent, and/or the like. The diagnostic and/or baseline information which informs the parameters of the methods advances the goal of personalization and precision.

According to any of the computer-implemented methods of the present disclosure, a suitable combination of hardware and software is employed to perform one or more steps of the methods, which hardware and software will vary depending upon the type of neural and/or physiological monitoring performed, the type of sensory environment presented to the individual, etc. In one non-limiting example the heart rate (HR) of the individual is monitored and forms the basis (at least in part) for a modification to the intensity of a sensory environment presented to the individual. According to this example, an algorithm that may be employed according to some embodiments is as follows:

Given:
2 values 'highest_threshold' and 'middle_threshold' that determine 2 different HR levels of high excitement and moderate excitement
'current_heart_rate': A live measure of the individual's current heart rate level
'stimulus_intensity': A variable that determines the intensity of a visual and/or auditory stimulus The algorithm may check, on every update of the individual's HR level:
if (current_heart_rate>highest_threshold)
then stimulus_intensity=1
else if (current_heart_rate>middle_threshold)
then stimulus_intensity=2
else
stimulus_intensity=3

The algorithm may then apply a smooth transition between states, if the current updated state is different than the state being displayed.

As will be appreciated, the algorithm above or similar algorithms may be employed based one or more of any desired combination of neural and/or physiological parameters being monitored, or a determined state of the individual (which may comprise one or more of stress, mood, attention, and/or arousal) as determined based on the individual's neural status and/or the physiological status.

Modifications of sensory environments to produce modified sensory environments based on monitoring of neural and/or physiological statuses of individuals may be performed using any suitable approaches. Adaptive methodologies/algorithms that may be employed include, but are not limited to, parameter estimation by sequential testing (PEST), maximum-likelihood procedures, and staircase procedures. According to certain embodiments, the modification/adaptation is achieved using PEST, which is characterized by an algorithm for threshold searching that changes both step sizes and direction (i.e., increasing and decreasing level) across a set of trials. Changes in step size are used to focus the adaptive track ever more finely, stopping the track when the estimate has been adequately defined. The final estimate is simply the final value determined by the trial placement procedure. The PEST algorithm is designed to place trials at the most efficient locations along the stimulus axis in order to increase measurement precision while minimizing the number of trials required to estimate a threshold.

In certain embodiments, sensory environment modification/adaptation is effected using maximum-likelihood procedures. In maximum-likelihood procedures, sets of stimulus-response trials are fit with an ogival function and subsequent trial placement and threshold estimation is taken from those fitted functions. Maximum-likelihood procedures are characterized by stimulus placement on each trial, driven by consulting the current best estimate of the entire underlying function after every stimulus-response trial. As the adaptive track grows in length, the estimated function becomes better defined by the collection of data points generated from previous trials. After each trial, the set of stimulus levels and the proportion of correct responses associated with each level are combined to form a function. The individual points are fitted with an ogival function and a current estimated threshold level is extracted. A new function is generated after each trial or set of trials, and subsequent trials are placed at a targeted performance level on the most up-to-date function. A maximum-likelihood fitting algorithm is typically used with this type of procedure.

According to certain embodiments, sensory environment modification/adaptation is achieved using an adaptive staircase algorithm/procedure. Staircase procedures generally use the previous one or more responses within an adaptive track to select the next trial placement, then provide a threshold estimate in a variety of ways, e.g., by averaging the levels at the direction reversals in the adaptive track (i.e., the turnaround points). Up-down staircases call for a reduction in stimulus level when the subject's response is positive and an increase in stimulus level when the response is negative. Beginning at a level above threshold, positive responses lead to continued decreases in stimulus level until a negative response occurs. This triggers a reversal in the direction of the track, and levels on subsequent trials increase until the next change in response. The up-down staircase procedure targets the 50% performance level on a function that extends from 0% correct performance at chance to 100% correct performance. That is, the track targets the stimulus level for which the probability of a correct response equals the probability of an incorrect response or, equivalently, the level at which the track would move up or down on the stimulus axis with equal probability. The value of this type of procedure is in the very few assumptions necessary for its implementation. To target a higher performance level, the sequence for a downward movement may be two or more positive responses, and the sequence for an upward movement may remain at one negative response. This example is a two-down, one-up procedure, which targets the 70.7% level on the function. Recalling that the probability of the down sequence must equal the probability of an up sequence, a positive response to two consecutive trials must occur in order to move the track downward. If p is the probability of a positive response on a given trial, then p×p must equal 0.50, and therefore the target probability is 0.707. Similarly, a three-down, one-up transformation leads to a performance target of 0.794 ($p^3$=0.50; the cube root of 0.50 is 0.794).

Systems and Computer Readable Media

As summarized above, the present disclosure also provides systems. In certain embodiments, provided are systems for presenting sensory environments to an individual experiencing the effects of a psychoactive agent. Such systems comprise one or more processors and one or more non-transitory computer-readable media. The one or more non-transitory computer-readable media comprises instructions stored thereon that cause the system to present a sensory environment to an individual experiencing the effects of a psychoactive agent, monitor the neural status, the physiological status, or both, of the individual, and present a modified sensory environment to the individual based on the monitoring.

In certain embodiments, the one or more non-transitory computer-readable media comprises instructions stored thereon that cause the system to monitor the neural status of the individual using one or more neural status monitoring devices. The one or more neural status monitoring devices may comprise one or more of an electroencephalography (EEG) device, a functional magnetic resonance imaging (fMRI) device, a near-infrared spectroscopy (NIRS) device, an electrocortocography (ECoG) device, or any combination thereof. According to some embodiments, the system further comprises the one or more neural status monitoring devices.

According to some embodiments, the one or more non-transitory computer-readable media comprises instructions stored thereon that cause the system to monitor the physiological status of the individual using one or more physiological status monitoring devices. The one or more physiological status monitoring devices may comprise one or more of a heart rate monitor, a blood pressure monitor, a galvanic skin response (GSR) monitor, a movement tracker, an eye movement tracker, a facial expression monitor, and any combination thereof. According to some embodiments, the system further comprises the one or more physiological status monitoring devices.

In certain embodiments, the one or more non-transitory computer-readable media comprises instructions stored thereon that cause the system to present sensory stimuli to the individual comprising one or more visual stimuli, one or more auditory stimuli, one or more tactile stimuli, one or more olfactory stimuli, or any combination thereof, via one or more output devices. For example, according to some embodiments, the one or more non-transitory computer-readable media comprises instructions stored thereon that cause the system to present one or more visual stimuli (e.g., photos, videos, colors, patterns, and/or the like) to the individual via a display. In certain embodiments, the non-transitory computer-readable medium comprises instructions stored thereon that cause the system to present one or more auditory stimuli (e.g., music, nature sounds, tones, and/or the like) to the individual via one or more speakers, headphones, and/or the like. In certain embodiments, the system further comprises the one or more output devices.

According to some embodiments, the one or more non-transitory computer-readable media comprises instructions stored thereon that cause the system to monitor the neural status, the physiological status, or both, of the individual continuously for a period of time to monitor the state of the individual in real-time, wherein the state of the individual comprises one or more of stress, mood, attention, arousal, and any combination thereof. In certain embodiments, the one or more non-transitory computer-readable media comprises instructions stored thereon that cause the system to present a customized sensory environment to the individual in real-time based on the monitoring.

Non-transitory physical computer readable media of the present disclosure include, but are not limited to, disks (e.g., magnetic or optical disks), solid-state storage drives, cards, tapes, drums, punched cards, barcodes, and magnetic ink characters and other physical medium that may be used for storing representations, instructions, and/or the like.

A system of the present disclosure may include one or more neural activity monitoring devices and/or one or more physiological status monitoring devices electrically connected, either wired or wirelessly, to a computing device having a logic subsystem. The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may include individual components that are distributed among two or more devices, which can be remotely located and/or configured for coordinated processing. Aspects of the logic subsystem may be virtualized and executed by remotely accessible networked computing devices configured in a cloud-computing configuration.

The system may further include a storage subsystem that includes one or more physical, non-transitory, devices configured to hold data and/or instructions executable by the logic subsystem to implement the methods of the present disclosure. When such methods and processes are implemented, the state of storage subsystem may be transformed, e.g., to hold different data.

The storage subsystem may include removable media and/or built-in devices. Storage subsystems may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystems may include volatile, nonvolatile, dynamic, static, read/write, read-only, random-access, sequential-access, location-addressable, file-addressable, and/or content-addressable devices.

Storage subsystems may include one or more physical, non-transitory devices. However, in some embodiments, aspects of the instructions described herein may be propagated in a transitory fashion by a pure signal, e.g., an electromagnetic or optical signal, etc. that is not held by a physical device for a finite duration. Furthermore, data and/or other forms of information pertaining to the present disclosure may be propagated by a pure signal.

According to certain embodiments, aspects of the logic subsystem and of the storage subsystem may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

Non-transitory computer-readable media such as those described above with respect to the systems of the present disclosure are also provided.

A variety of processor-based devices/systems may be employed to implement the embodiments of the present disclosure. Such systems may include system architecture wherein the components of the system are in electrical communication with each other using a bus. System architecture can include a processing unit (CPU or processor), as well as a cache, that are variously coupled to the system bus. The bus couples various system components including system memory, (e.g., read only memory (ROM) and random access memory (RAM), to the processor.

System architecture can include a cache of high-speed memory connected directly with, in close proximity to, or integrated as part of the processor. System architecture can copy data from the memory and/or the storage device to the cache for quick access by the processor. In this way, the cache can provide a performance boost that avoids processor delays while waiting for data. These and other modules can control or be configured to control the processor to perform various actions. Other system memory may be available for use as well. Memory can include multiple different types of memory with different performance characteristics. Processor can include any general purpose processor and a hardware module or software module, such as first, second and third modules stored in the storage device, configured to control the processor as well as a special-purpose processor where software instructions are incorporated into the actual processor design. The processor may essentially be a completely self-contained computing system, containing multiple cores or processors, a bus, memory controller, cache, etc. A multi-core processor may be symmetric or asymmetric.

To enable user interaction with the computing system architecture, an input device can represent any number of input mechanisms, such as a microphone for speech, a touch-sensitive screen for gesture or graphical input, keyboard, mouse, motion input, speech and so forth. An output device can also be one or more of a number of output mechanisms. In some instances, multimodal systems can enable a user to provide multiple types of input to communicate with the computing system architecture. A communications interface can generally govern and manage the user input and system output. There is no restriction on operating on any particular hardware arrangement and therefore the basic features here may easily be substituted for improved hardware or firmware arrangements as they are developed.

The storage device is typically a non-volatile memory and can be a hard disk or other types of computer-readable media which can store data that are accessible by a computer, such as magnetic cassettes, flash memory cards, solid state memory devices, digital versatile disks, cartridges, random access memories (RAMs), read only memory (ROM), and hybrids thereof.

The storage device can include software modules for controlling the processor. Other hardware or software modules are contemplated. The storage device can be connected to the system bus. In one aspect, a hardware module that performs a particular function can include the software component stored in a computer-readable medium in connection with the necessary hardware components, such as the processor, bus, output device, and so forth, to carry out various functions of the disclosed technology.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Notwithstanding the appended claims, the present disclosure is also defined by the following embodiments:
1. A method comprising:
    presenting a sensory environment to an individual experiencing the effects of a psychoactive agent;
    monitoring the neural status, the physiological status, or both, of the individual; and
    presenting a modified sensory environment to the individual based on the monitoring.
2. The method according to embodiment 1, wherein the psychoactive agent is a psychedelic agent.
3. The method of embodiment 2, wherein the psychedelic agent is selected from the group consisting of: psilocybin, 3,4-Methylenedioxymethamphetamine (MDMA), lysergic acid diethylamide (LSD), N,N-Dimethyltryptamine (DMT), mescaline, peyote, 2,5-dimethoxy-4-bromophenethylamine (2C—B), 2,5-Dimethoxy-4-methylamphetamine (DOM), NBOMes (N-methoxybenzyl), and any combination thereof.
4. The method according to any one of embodiments 1 to 3, wherein presenting a sensory environment to the individual comprises presenting to the individual one or more visual stimuli, one or more auditory stimuli, one or more tactile stimuli, one or more olfactory stimuli, or any combination thereof.
5. The method according to any one of embodiments 1 to 4, wherein the monitoring comprises monitoring the neural status of the individual.
6. The method according to embodiment 5, wherein the neural status of the individual is monitored by electroencephalography (EEG), functional magnetic resonance imaging (fMRI), near-infrared spectroscopy (NIRS), electrocortocography (ECoG), or any combination thereof.
7. The method according to any one of embodiments 1 to 6, wherein the monitoring comprises monitoring the physiological status of the individual.
8. The method according to embodiment 7, wherein monitoring the physiological status of the individual comprises monitoring one or more of the individual's heart rate, blood pressure, electrodermal activity, movement, eye movement, facial expression, and any combination thereof.
9. The method according to embodiment 7 or embodiment 8, wherein one or more physiological parameters of the individual are monitored using a wearable device.
10. The method according to any one of embodiments 7 to 9, wherein one or more physiological parameters of the individual are monitored using one or more cameras.
11. The method according to any one of embodiments 1 to 10, wherein monitoring the neural status, the physiological status, or both, of the individual is performed continuously for a period of time and is used to monitor the state of the individual in real-time, wherein the state of the individual comprises one or more of stress, mood, attention, arousal, and any combination thereof.
12. The method according to any one of embodiments 1 to 11, wherein presenting a modified sensory environment to the individual comprises presenting a customized sensory environment to the individual in real-time based on the monitoring.
13. The method according to any one of embodiments 1 to 12, further comprising, prior to presenting the sensory environment to the individual, administering an effective amount of the psychoactive agent to the individual.
14. The method according to any one of embodiments 1 to 13, wherein the individual is suffering from a mental health condition selected from the group consisting of: depression, anxiety, post-traumatic stress disorder (PTSD), addiction, and any combination thereof.
15. The method according to embodiment 14, wherein the method is effective in treating the mental health condition.
16. The method according to any one of embodiments 1 to 15, wherein one or more steps of the method are computer-implemented.
17. The method according to embodiment 16, wherein each step of the method is computer-implemented.
18. A system for presenting sensory environments to an individual experiencing the effects of a psychoactive agent, comprising:
    one or more processors; and one or more non-transitory computer-readable media comprising instructions stored thereon that cause the system to:
present a sensory environment to an individual experiencing the effects of a psychoactive agent;
monitor the neural status, the physiological status, or both, of the individual; and
present a modified sensory environment to the individual based on the monitoring.

19. The system of embodiment 18, wherein the one or more non-transitory computer-readable media comprises instructions stored thereon that cause the system to monitor the neural status of the individual using one or more neural status monitoring devices.

20. The system of embodiment 19, wherein the one or more neural status monitoring devices comprises one or more of an electroencephalography (EEG) device, a functional magnetic resonance imaging (fMRI) device, a near-infrared spectroscopy (NIRS) device, an electrocorticography (ECoG) device, or any combination thereof.

21. The system of embodiment 19 or embodiment 20, wherein the system further comprises the one or more neural status monitoring devices.

22. The system of any one of embodiments 18 to 21, wherein the one or more non-transitory computer-readable media comprises instructions stored thereon that cause the system to monitor the physiological status of the individual using one or more physiological status monitoring devices.

23. The system of embodiment 22, wherein the one or more physiological status monitoring devices comprises one or more of a heart rate monitor, a blood pressure monitor, an electrodermal activity monitor, a movement tracker, an eye movement tracker, and a facial expression monitor.

24. The system of embodiment 22 or embodiment 23, wherein the system further comprises the one or more physiological status monitoring devices.

25. The system of any one of embodiments 18 to 24, wherein the one or more non-transitory computer-readable media comprises instructions stored thereon that cause the system to present sensory stimuli to the individual comprising one or more of a visual stimulus, an auditory stimulus, a tactile stimulus, an olfactory stimulus, or any combination thereof, via one or more output devices.

26. The system of embodiment 25, wherein the one or more non-transitory computer-readable media comprises instructions stored thereon that cause the system to present one or more visual stimuli to the individual via a display.

27. The system of any one of embodiments 18 to 26, wherein the one or more non-transitory computer-readable media comprises instructions stored thereon that cause the system to present one or more auditory stimuli to the individual via one or more speakers.

28. The system of any one of embodiments 25 to 27, wherein the system further comprises the one or more output devices.

29. The system of any one of embodiments 18 to 28, wherein the one or more non-transitory computer-readable media comprises instructions stored thereon that cause the system to monitor the neural status, the physiological status, or both, of the individual continuously for a period of time to monitor the state of the individual in real-time, wherein the state of the individual comprises one or more of stress, mood, attention, arousal, and any combination thereof.

30. The system of any one of embodiments 18 to 29, wherein the one or more non-transitory computer-readable media comprises instructions stored thereon that cause the system to present a customized sensory environment to the individual in real-time based on the monitoring.

31. One or more non-transitory computer-readable media comprising instructions stored thereon that cause a system to:
present a sensory environment to an individual experiencing the effects of a psychoactive agent;
monitor the neural status, the physiological status, or both, of the individual; and
present a modified sensory environment to the individual based on the monitoring.

32. The one or more non-transitory computer-readable media of embodiment 31, comprising instructions stored thereon that cause a system to monitor the neural status of the individual using one or more neural status monitoring devices.

33. The one or more non-transitory computer-readable media of embodiment 32, wherein the one or more neural status monitoring devices comprises one or more of an electroencephalography (EEG) device, a functional magnetic resonance imaging (fMRI) device, a near-infrared spectroscopy (NIRS) device, an electrocortocography (ECoG) device, or any combination thereof.

34. The one or more non-transitory computer-readable media of any one of embodiments 31 to 33, comprises instructions stored thereon that cause a system to monitor the physiological status of the individual using one or more physiological status monitoring devices.

35. The one or more non-transitory computer-readable media of embodiment 34, wherein the one or more physiological status monitoring devices comprises one or more of a heart rate monitor, a blood pressure monitor, an electrodermal activity monitor, a movement tracker, an eye movement tracker, and a facial expression monitor.

36. The one or more non-transitory computer-readable media of any one of embodiments 31 to 35, comprising instructions stored thereon that cause a system to present sensory stimuli to the individual comprising one or more of a visual stimulus, an auditory stimulus, a tactile stimulus, an olfactory stimulus, or any combination thereof, via one or more output devices.

37. The one or more non-transitory computer-readable media of embodiment 36, comprising instructions stored thereon that cause a system to present one or more visual stimuli to the individual via a display.

38. The one or more non-transitory computer-readable media of embodiment 36 or embodiment 37, comprising instructions stored thereon that cause a system to present one or more auditory stimuli to the individual via one or more speakers.

39. The one or more non-transitory computer-readable media of any one of embodiments 31 to 38, comprising instructions stored thereon that cause a system to monitor the neural status, the physiological status, or both, of the individual continuously for a period of time to monitor the state of the individual in real-time, wherein the state of the individual comprises one or more of stress, mood, attention, arousal, and any combination thereof.

40. The one or more non-transitory computer-readable media of any one of embodiments 31 to 39, comprising instructions stored thereon that cause a system to present a customized sensory environment to the individual in real-time based on the monitoring.

The following examples are offered by way of illustration and not by way of limitation.

EXPERIMENTAL

Example 1

In this example, a therapist meets with her patient suffering from PTSD and prepares him for his Closed-Loop Psychedelic Treatment. He applies sensors and lays down in a pod that has cameras positioned for real-time state recording, and devices positioned to create full virtual sensory immersion: visual, tactile, auditory and olfactory. After a brief calibration period, the system is set and the treatment is ready to begin. The patient is administered a dose of psilocybin and is asked to relax. Over the course of the next couple of hours the patient travels internally to confront the trauma that has impaired his life. While this happens, the therapist is viewing his real-time state on a large screen. She can see him moving through a three-dimensional representation of his stress, mood, attention, arousal in the moment. Based upon this data and advice offered by an artificial intelligence (AI) who has access to thousands of previous sessions, she adjusts the sensory stimuli to which he is exposed. And so, he journeys through simulated natural environments that he can hear, see, smell and feel, which are being adjusted in real-time based upon his state in the moment. 2.5 hours into the session, the therapist views and is alerted that her patient has moved into a high-intensity domain of great healing potential: High stress of negative valence with internally-directed attention coupled with high arousal. Data suggests this is a highly therapeutic zone for PTSD patients, but only in 15 minute increments (especially on a first treatment) as longer exposure can worsen trauma. Based on this data coupled with the AI recommendation, after 15 minutes she introduces the scent of pine trees, a visualization of a sky of white clouds, a low frequency body vibration and a sound of a waterfall. Data has showed that 99% of the time this stimulation moves a participant out of this high-intensity state to initiate a cool-down period. The session ends 30 minutes later.

Accordingly, the preceding merely illustrates the principles of the present disclosure. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein.

What is claimed is:

1. A method comprising:
   presenting a sensory environment to an individual experiencing the effects of a psychedelic agent;
   monitoring the neural status, the physiological status, or both, of the individual; and
   presenting a modified sensory environment to the individual based on the monitoring.

2. The method of claim 1, wherein the psychedelic agent is selected from the group consisting of: psilocybin, 3,4-Methylenedioxymethamphetamine (MDMA), lysergic acid diethylamide (LSD), N,N-Dimethyltryptamine (DMT), mescaline, peyote, 2,5-dimethoxy-4-bromophenethylamine (2C—B), 2,5-Dimethoxy-4-methylamphetamine (DOM), NBOMes (N-methoxybenzyl), and any combination thereof.

3. The method according to claim 1, wherein presenting a sensory environment to the individual comprises presenting to the individual one or more visual stimuli, one or more auditory stimuli, one or more tactile stimuli, one or more olfactory stimuli, or any combination thereof.

4. The method according to claim 1, wherein the monitoring comprises monitoring the neural status of the individual.

5. The method according to claim 4, wherein the neural status of the individual is monitored by electroencephalography (EEG), functional magnetic resonance imaging (fMRI), near-infrared spectroscopy (NIRS), electrocorticography (ECOG), or any combination thereof.

6. The method according to claim 1, wherein the monitoring comprises monitoring the physiological status of the individual.

7. The method according to claim 6, wherein monitoring the physiological status of the individual comprises monitoring one or more of the individual's heart rate, blood pressure, respiration, electrodermal activity, movement, eye movement, facial expression, and any combination thereof.

8. The method according to claim 1, wherein monitoring the neural status, the physiological status, or both, of the individual is performed continuously for a period of time and is used to monitor the state of the individual in real-time, wherein the state of the individual comprises one or more of stress, mood, attention, arousal, and any combination thereof.

9. The method according to claim 1, wherein presenting a modified sensory environment to the individual comprises presenting a customized sensory environment to the individual in real-time based on the monitoring.

10. The method according to claim 1, wherein the individual is suffering from a mental health condition selected from the group consisting of: depression, anxiety, post-traumatic stress disorder (PTSD), addiction, and any combination thereof.

11. The method according to claim 10, wherein the method is effective in treating the mental health condition.

12. A system for presenting sensory environments to an individual experiencing the effects of a psychoactive agent, comprising:
   one or more output devices;
   one or more processors; and
   one or more non-transitory computer-readable media comprising instructions stored thereon that cause the system to:
      present a sensory environment to an individual experiencing the effects of a psychoactive agent, wherein presenting a sensory environment to the individual comprises presenting sensory stimuli to the individual comprising one or more of a visual stimulus, an auditory stimulus, a tactile stimulus, an olfactory stimulus, or any combination thereof, via the one or more output devices;

monitor the neural status, the physiological status, or both, of the individual; and present a modified sensory environment to the individual based on the monitoring.

13. One or more non-transitory computer-readable media comprising instructions stored thereon that cause a system to:

present a sensory environment to an individual experiencing the effects of a psychoactive agent, wherein presenting a sensory environment to the individual comprises presenting sensory stimuli to the individual comprising one or more of a visual stimulus, an auditory stimulus, a tactile stimulus, an olfactory stimulus, or any combination thereof, via one or more output devices;

monitor the neural status, the physiological status, or both, of the individual; and present a modified sensory environment to the individual based on the monitoring.

14. The one or more non-transitory computer-readable media of claim 13, comprising instructions stored thereon that cause a system to monitor the neural status of the individual using one or more neural status monitoring devices.

15. The one or more non-transitory computer-readable media of claim 14, wherein the one or more neural status monitoring devices comprises one or more of an electroencephalography (EEG) device, a functional magnetic resonance imaging (fMRI) device, a near-infrared spectroscopy (NIRS) device, an electrocortocography (ECOG) device, or any combination thereof.

16. The one or more non-transitory computer-readable media of claim 13, comprising instructions stored thereon that cause a system to monitor the physiological status of the individual using one or more physiological status monitoring devices.

17. The one or more non-transitory computer-readable media of claim 16, wherein the one or more physiological status monitoring devices comprises one or more of a heart rate monitor, a blood pressure monitor, an electrodermal activity monitor, a movement tracker, an eye movement tracker, and a facial expression monitor.

18. The one or more non-transitory computer-readable media of claim 13, comprising instructions stored thereon that cause the system to monitor the neural status, the physiological status, or both, of the individual continuously for a period of time to monitor the state of the individual in real-time, wherein the state of the individual comprises one or more of stress, mood, attention, arousal, and any combination thereof.

19. A method comprising:

presenting a sensory environment to an individual experiencing the effects of a psychoactive agent, wherein presenting a sensory environment to the individual comprises presenting to the individual one or more visual stimuli, one or more auditory stimuli, one or more tactile stimuli, one or more olfactory stimuli, or any combination thereof;

monitoring the neural status, the physiological status, or both, of the individual; and presenting a modified sensory environment to the individual based on the monitoring.

20. A method comprising:

presenting a sensory environment to an individual experiencing the effects of a psychoactive agent;

monitoring the neural status, the physiological status, or both, of the individual; and presenting a modified sensory environment to the individual based on the monitoring, wherein presenting a modified sensory environment to the individual comprises presenting a customized sensory environment to the individual in real-time based on the monitoring.

* * * * *